Nov. 10, 1970 H. HERGER ET AL 3,539,791

METHOD AND APPARATUS FOR MULTIPLICATION BY MEANS OF AN ELECTRONIC COMPUTER

Filed March 9, 1967 4 Sheets-Sheet 1

| ADDRESS IN ACCUMULATOR | COUNTER RZ5 | COUNTER RZ6 | | | |
|---|---|---|---|---|---|
| 1 | 1 | 1 | | | |
| 2 | 2 | 2 | | | |
| 3 | 3 | 3 | | | |
| 4 | 4 | 4 | | | |
| 5 | 5 | 5 | | | |
| 6 | 1 | 6 | | | |
| 7 | 2 | 1 | | | |
| 8 | 3 | 2 | | | |
| 9 | 4 | 3 | | | |
| 10 | 5 | 4 | | | |
| 11 | 1 | 5 | | | |
| 12 | 2 | 6 | | | |
| 13 | 3 | 1 | | | |
| 14 | 4 | 2 | | | |
| 15 | 5 | 3 | | | |
| 16 | 1 | 4 | | | |
| 17 | 2 | 5 | | | |
| 18 | 3 | 6 | | | |
| 19 | 4 | 1 | | | |
| 20 | 5 | 2 | | | |
| 21 | 1 | 3 | | | |
| 22 | 2 | 4 | | | |
| 23 | 3 | 5 | | | |
| 24 | 4 | 6 | | | |
| 25 | 5 | 1 | | | |
| 26 | 1 | 2 | | | |
| 27 | 2 | 3 | | | |
| 28 | 3 | 4 | | | |
| 29 | 4 | 5 | | | |
| 30 | 5 | 6 | | | |
| | | | | | |

Fig. 3

Nov. 10, 1970 H. HERGER ET AL 3,539,791

METHOD AND APPARATUS FOR MULTIPLICATION BY MEANS OF AN ELECTRONIC COMPUTER

Filed March 9, 1967 4 Sheets-Sheet 4

United States Patent Office
3,539,791
Patented Nov. 10, 1970

3,539,791
METHOD AND APPARATUS FOR MULTIPLICATION BY MEANS OF AN ELECTRONIC COMPUTER

Horst Herger and Klaus Scheer, Bielefeld, Germany, assignors to Anker-Werke Aktiengesellschaft, Bielefeld, Germany, a corporation of Germany Filed Mar. 9, 1967, Ser. No. 621,963
Claims priority, application Germany, Sept. 29, 1966, A 53,616
Int. Cl. G06f 7/44
U.S. Cl. 235—160 11 Claims

ABSTRACT OF THE DISCLOSURE

An electronic computer system, preferably for use with accounting machines equipped with a mechanical-electrical code converter through which the machine mechanisms are operatively connected with the electronic computer, which performs multiplying operations by repeated addition with the aid of an accumulator matrix of magnetic ring cores for storing the intermediate sums and the ultimate product. The multi-digit multiplicator is stored in the accumulator and then read out, column by column and hence decimal by decimal, into an adder into which the multiplicand is simultaneously entered, also decimal by decimal commencing with the least significant decimal, and each time is added to the multiplicator decimal as often as corresponds to the numerical value of the multiplicand decimal. Each time the sum is written back into the accumulator decimal column just read out. Whenever the reading of an accumulator column encounters a stored decimal value larger than zero—this being ascertained by a discriminator circuit—a given number of columns is skipped in the direction toward the less significant (lower) decimal digits of the accumulator, and the multiplicator columnar value next to be read out of the accumulator is reduced by 1 before the reading and adding operation is repeated.

Our invention relates to a method and apparatus for performing multiplying operations by means of an electronic computer with magnetic ring core matrixes for storing intermediate results or subtotals as well as the ultimate result.

There are known computing methods for multiplying with the aid of an electronic computer that require the provision of shift registers for shifting the memory content of the serially conected multiplier and partial-product memories toward higher digital value positions. This This involves a considerable number of control components and appertaining circuits.

It is an object of our invention to reduce the amount of circuitry and components required for such electronic computing equipment to secure best feasible operational reliability.

Another, more specific object of the invention is to devise a method and equipment for performing multiplying operations by means of a computing device constituted essentially of ferrite core matrices, which does away with the shifting of intermediate or partial results during multiplying operation in the accumulator designed as a ring-core matrix.

Our invention is predicated upon a method for performing multiplying operations with the aid of an electronic computer which comprises an accumulator, designed as a ringcore matrix, for storing the intermediate or partial results as well as the ultimate product, and which also comprises a device for controlling the multiplying performance constituted by a repetition of adding operations. Based upon such a computing system and method, and in accordance with a feature of our invention, the multiplying operation, effected by repetitive addition of the multiplicand (factor) directly read out of the input device, is controlled by a column selector circuit of the accumulator. The reading of the columns takes place in an ascending sequence begining with the least significant digit (column). At the same time, the items read out of the accumulator or the input device are entered into the computer. Upon completion of the addition, the result is written into the accumulator column previously read out. When during such reading of the columns, a column is reached into which there is written a multiplicator decimal larger than zero, the above-mentioned column selector circuit is effective to operate in dependence upon a step counter and a discriminator to produce a column jump toward the right by a number of columns determined by a step counter, and to then perform the next read-out operation.

The invention is particularly well suited for relatively small electronic computing apparatus comprising a minimal number of control means for effecting the computing operations so as to be correspondingly low in cost, while securing a reliable operation for extended periods of time free of maintenance by virtue of the predominant use of ringcore matrices.

According to a preferred embodiment of the invention, the accumulator is subdivided into a left portion and a right portion; the multiplicator at the beginning of the multiplying operation is written into the left portion of the accumulator; and the individual decimals of the multiplicand, taken from an input device or memory, are sequentially entered, one after the other, into a computer in an ascending sequence. In the computer, the individual decimals of the multiplicand are written into the right portion of the accumulator, commencing with the decimal of the least significant (lowest) digit position which is located a given number of columns to the right of the lowest multiplicator decimal. During the selector operation, the decimals of the multiplicand are likewise entered into the computer an dare added as often as is required by the value of the lowest decimal position of the multiplicator, while the resulting values, commencing with the previously read-out column, are written just as often into the accumulator. During each addition and writing-in operation the multiplicator decimal value is reduced by 1. While the column containing the next higher decimal position of the multiplicator is being read out, in dependence upon the value position of the read-out decimal, another column located the predetermined number of positions to the right of the readout accumulator column is first read out and furnishes a numeral which is added in the computer, commencing with the least significant (lowest) value position of the multiplicand. The intermediate result is again written into the previously read-out column of the accumulator. This is done as often as is needed to reduce the decimal position of the multiplicator down to zero. After all of the decimal positions of the multiplicator are evaluated in this same manner, the resulting product is available in the accumulator for further processing, in an ascending sequence commencing with the lowest value position of the column first read out of the right portion of the accumulator.

According to another feature of the invention, the above-mentioned accumulator is essentially constituted by a matrix of ring cores into which numerical data are written from a computer and from a manually actuable posting device, as well as from a memory or the like under control by a monitor, programming or other control system; and the resulting numerical data are read out from the same matrix. Such a system according to the invention is characterized by the fact that the individual columns of the matrix accumulator are selectable in ascending sequence by means of a selector circuit formed essentially by a counter having $n$ or $n+1$ counting positions. The selector circuit operates in dependence upon a step counter, a discriminator circuit and logic circuit to pass once or several times through the selecting range, commencing with the lowest-positive column and passing through a number of columns determined by the step counter, in dependence upon the digit position value of the multiplicator decimal position evaluated by the discriminator circuit. An intermediate data storer or memory coordinated to the selector circuit controls the occurrence of a jump responding to a given number of columns toward the right, this number of columns being determined by the stepping switch.

The above-mentioned and further objects, advantages and features of our invention, said features being set forth with particularity in the claims annexed hereto, will be apparent from, and will be described in, the following with reference to an embodiment of a computer system according to the invention illustrated by way of example on the accompanying drawings.

FIG. 3 is an explanatory tabulation relating to the computer system of FIGS. 1 and 2.

Figure 1:
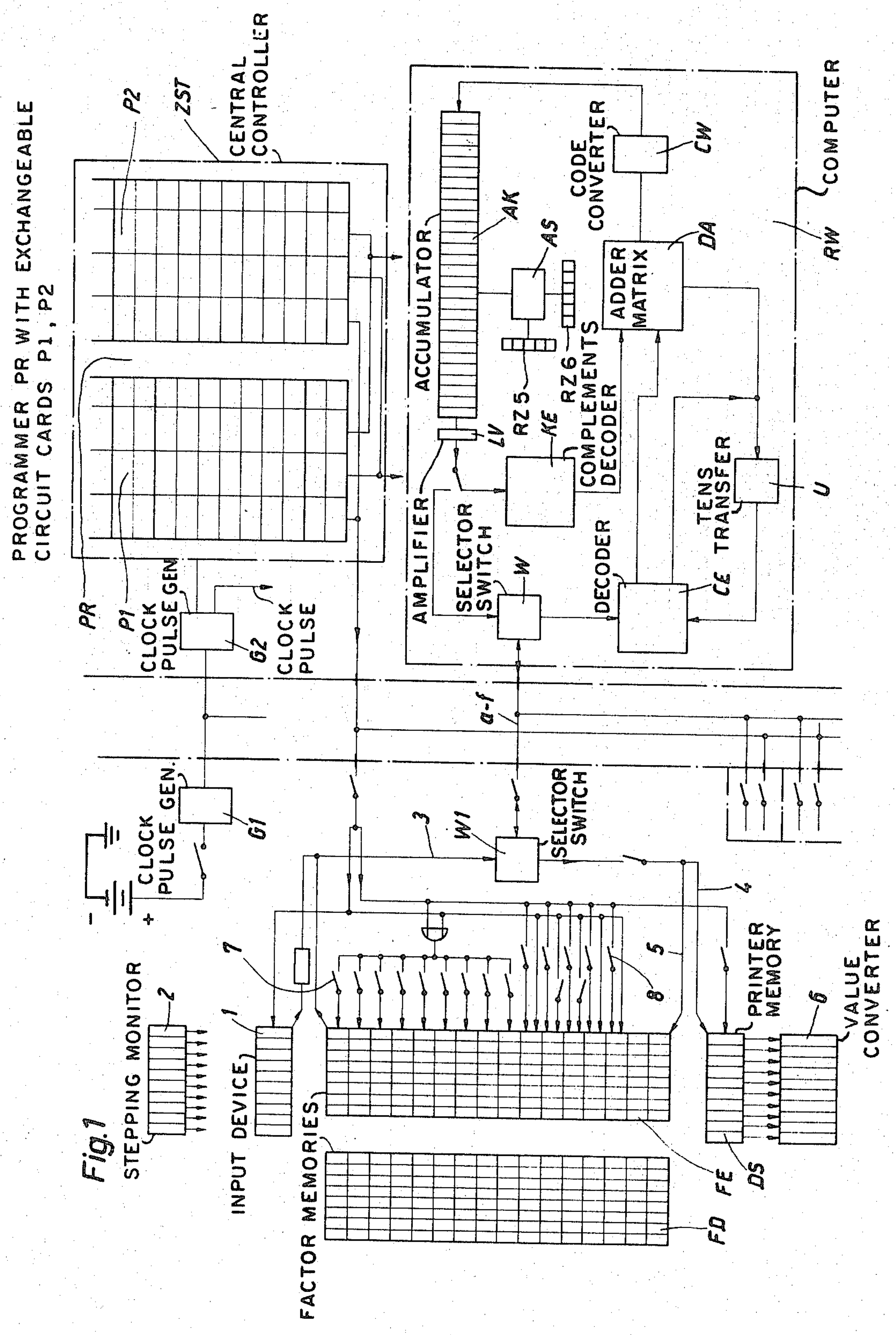
FIG. 1 is a diagrammatic block diagram of the computing system.

The computer system completely illustrated in FIG. 1, cooperates with a mechanical accounting machine of conventional type which is equipped with an electrical input device 1 for the values to be transferred from the mechanisms of the accounting machine into the electronic computer. An input device associated with a mechanical accounting machine in the manner just mentioned is known from U.S. Pat. 3,268,888. A particular input device well suited for the purposes of the present invention and applicable without change in the circuitry described in the present specification is illustrated and described in detail in the copending U.S. patent application Ser. No. 621,724, filed Mar. 1, 1967, of G. Rathmeier and H. Herger for Electromechanical Apparatus for Converting Coded Into Decoded Digital Values. The input device 1 comprises selector switches whose movable contact arms are adjustable under control by the differential mechanisms of the accounting machine. Associated with the computer system is an electronic stepping switch or monitor 2 of conventional type which sequentially applies voltage to the respective value-denoting output leads of the input device 1 for serially transferring the values from the input device to the computer proper, denoted as a whole by RW. The computer RW performs adding, subtracting as well as multiplying operations. The computer is monitored by a central controller ZST with a programmer PR, and is also connected with factor memories FD and FE.

The computer proper RW comprises a transfer decoder CE, a tens transfer circuit U, a complement decoder KE, an adder matrix DA, a code converter CW, an accumulator AK, and an appertaining selector circuit AS. Details of the particular computer RW shown by a block diagram in FIG. 1, as well as the performance of such a computer, are described in the copending U.S. applicatiton of H. Herger, Ser. No. 624,645, filed Mar. 1, 1967, for Electronic Computer for Series-Parallel Processing of Decimal Numbers.

The input components of the computer RW comprise a selector switch W. The data input leads $a$ to $f$ of the computer RW connect the selector switch W with another selector switch W1 which connects these leads either through conductors 3 to an input device 1, or through conductors 4 to a printer memory DS and through conductors 5 to the factor memories FD and FE. The memory cells of the printer memory DS are electrically connected with a value translating or converting mechanism 6 of the accounting machine, which mechanism operates to convert the values taken from the printer memory DS into respective measuring paths of different lengths, in dependence upon the controlling performance of pawls controlled by respective magnets, these measuring paths being scanned by mechanical feeler members of the accounting machine mechanism. Such an electromechanical code converter is described and illustrated in detail in the above-mentioned U.S. application Ser. No. 621,724.

The factor memory FE serves for storing constants, calendar dates, rates of interest and the like, as may be needed for computing the amount of interest due on deposits. The factor memory FD serves for storing other values, such as those required for computing the amount of interest due on loans. The two factor memories FD and FE are monitored from the accounting machine by means of switches 7 and 8 which are controlled by manually actuable control keys on the keyboard of the accounting machine for the purpose of posting the factors to enter into the computing operation. The memories FD and FE are further controlled from the central controller ZST or the appertaining programmer PR. The programmer comprises fixedly wires, exchangeable circuit plates (cards) P1 and P2, which cooperate with program step counters of conventional type (not illustrated). With the aid of the exchangeable circuit plates or cards P1, P2, several pre-selectable computing programs can be set, during whose course given factors are called out of the factor memories FD, FE, or the input device 1, and are thus entered into the computing operation being carried out.

The computer system further comprises a clock pulse (synchronizing) generator G1 which is switched on and off by operation of the accounting machine. A second pulse generator G2 furnishes the clock pulses required for controlling and operating the electronic computer circuitry.

The equipment for multiplying operations, which in modfied form is also suitable for performing divisions, is designed according to the invention as described presently.

Figure 2:
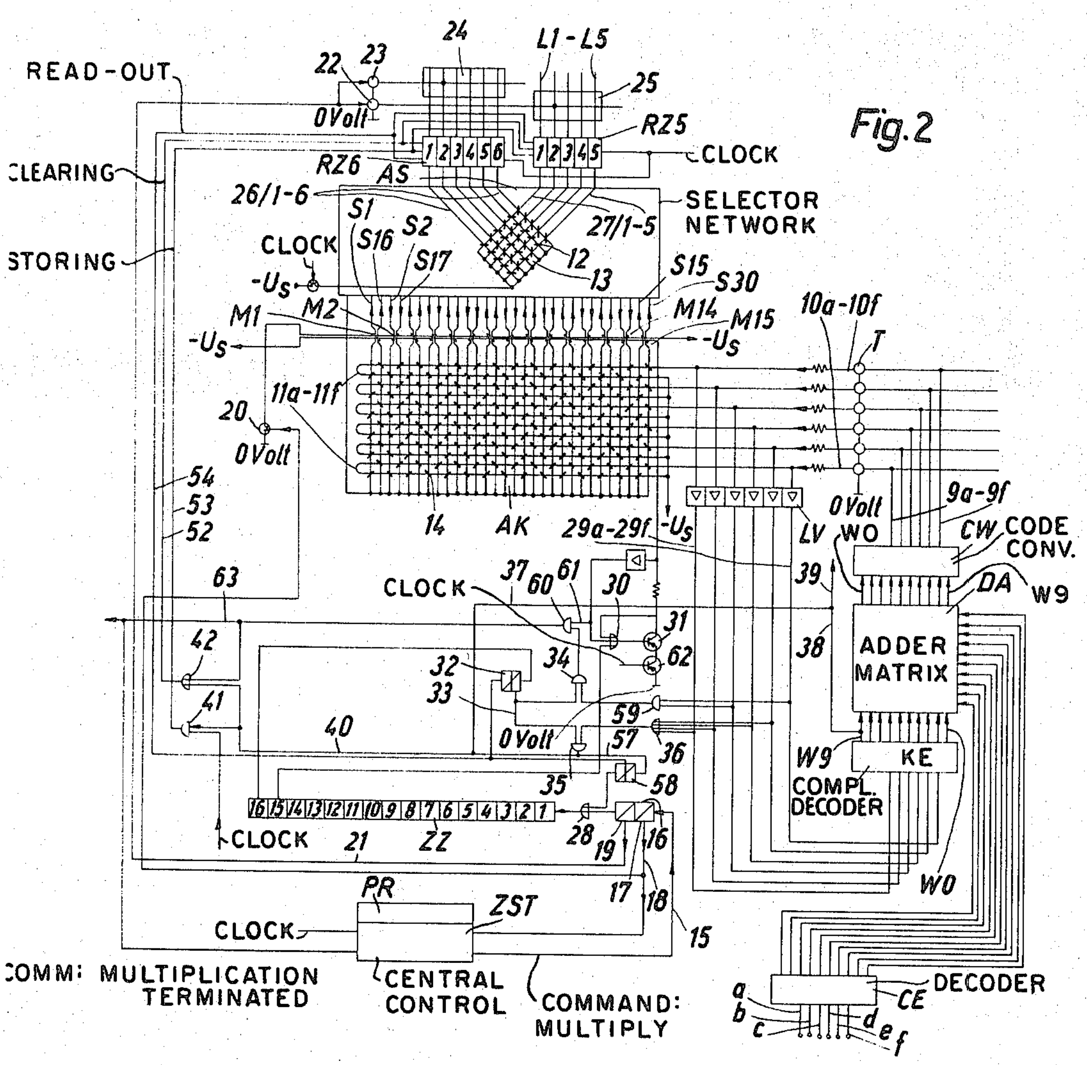
FIG. 2 is a schematic circuit diagram of the electronic computer corresponding to FIG. 1.

The adder matrix DA shown simplified in FIG. 2, is connected with the selector switch W (FIG. 1) through the transfer decoder CE. Respective value leads $w0$ to $w9$ extend from the adder matrix DA to the code converter CW. The output leads 9*a* to 9*f* of the code converter CW connect with the driver stage T constituted by transistors which in turn are connected by respective leads 10*a* to 10*f* with the accumulator AK. The accumulator is constituted essentially by a matrix of ring-shaped ferrite cores arranged in thirty columns S1 to S30 for storing thirty binary coded decimal numerals in the 2/6-code. In accordance with this code, the accumulator core matrix possesses six lines 11*a* to 11*f*. Located at the intersections the six lines 11*a* to 11*f* with the thirty columns S1 to S30 are a total of 180 ferrite cores 14 having a rectangular hysteresis loop charactistric. The reading and writing currents in the thirty columns S1 to S30 are taken from thirty driver cores 12 arranged in a matrix 13 of a selector network AS. The cores receive primary current from two ring counters RZ5 and RZ6 with five and six counting stages respectively.

The five steps of ring counter RZ5 and the six steps of ring counter RZ6 afford a total of thirty different possibilities of mutual coordination of the ring-counter output pulses, corresponding to the thirty columns in the accumulator AK.

The thirty accumulator columns are coordinated in paired relation, namely S1 and S16, S2 and S17, S3 and S18, and so forth up to S15 and S30. The column wires of columns S1 and S16, as well as those of columns S2 and S17 and so forth up to S15 and S30, pass further through a common core M1, M2 or M15. These are special marker cores and serve to control the multiplying operation. The cores 14 of the accumulator AK are continuously premagnetized by a biasing current equal to −⅓I (−one-third select current). For reading one of the columns S1 to S30, a current of −⅔I is passed through the particular column to be read out. This negative two-third select current is supplied through a correlated driver core 12 requiring coincidence between two of the outputs from the ring counters RZ5 and RZ6. In consequence, the corresponding one column S1 to S30 is traversed by a negative full select current −I, and the two cores contained in that particular column (corresponding to one of the characters in the 2-from-6 code) are read out. The numeral thus read out passes through the reading amplifier LZ into the adder matrix DA where it is modified by the addition of a second numeral appertaining to a second summand. The second summand may stem, for example, from one of the factor memories FE or FD or from the accounting machine with which the electronic computer is connected. The number (sum) modified in the adder matrix DA returns back to the line inputs of the accumulator AK after having been delayed through the driver circuitry. In the accumulator AK, the number now is manifested by currents flowing through the corresponding two lines of the cores 14, these currents amounting to +⅔I (+two-thirds select current). Simultaneously, the current in the column previously read out reverses and energizes the latter column with the current −⅔I. At the intersection points of these two current flows there occurs a total flow of +⅔ minus ⅓I (premagnetization). The sum is equal to the full positive select current +I so that two cores 14 are reversely magnetized in accordance with the coded sum value.

The multiplication is initiated by a pulse *n*P (new programming step) which is released in the central controller ZST by the appertaining programmer PR. This programming pulse passes through the lead 15 to the input of a shift register 16 where it sets a first bistable flip-flop 17. At the arrival of the next clock pulse, the flip-flop 17 issues at its output 18 a pulse, namely the command: multiplication, and also sets a second bistable flip-flop 19 of the shift register 16.

The command pulse at output 18 serves to set all control components in the computer to the state required for multiplication. The same command pulse places a transistor 20 to the conductive state. The transistor then issues a clearing pulse for the marker cores M1 to M5 whereby all of the marker cores M1 to M15 are set to the zero state. When the next clock pulse arrives, the flip-flop 19 issues a pulse. This output pulse passes through a lead 21 to switching transistors 22 and 23 connected with the distributor circuits 24 and 25.

The distributor circuits 24 and 25 may be designed as cross-bar distributors if the system operates with fixed programming, or they may constitute intermediate data memories which previously have received information from a monitor or programmer, such as in form of a programming command. In the illustrated example it is assumed that the distributor circuits 24 and 25 are cross-bar distributors and are plugged to bring both counters RZ5 and RZ6 to the starting step 2.

Six output leads 26/1 to 26/6 issue from counter RZ6, and five output leads 27/1 to 27/5 from counter RZ5. With the arrival of the next clock pulse, the counters RZ5 and RZ6 issue a current on their respective output leads 26/2 and 27/2, thus occupying through a driver core 12 the column S2 of the accumulator AK. The tabulation presented in FIG. 3 indicates which particular accumulator column is correlated to the respective counting steps of ring counters RZ5 and RZ6.

The last-mentioned clock pulse also causes the step counter ZZ to reach the position 1 (FIG. 2). This counter ZZ was previously set from the bistable flip-flop 19 through an OR-gate 28. The numeral read out of column S2 is transferred through the reader amplifier LV and the leads 29*a* to 29*f*, further through the complement decoder KE and the value leads W0 to W9 to the adder matrix DA where it is processed together with the second summand. The sum resulting from the two summands is written back into the column S2.

With the next following clock pulse both ring counters RZ5 and RZ6 issue a pulse through the respective outputs 26/3, 27/3 whereby the column S3 is read out of the accumulator AK. The same clock pulse causes the step counter ZZ to switch to position 2. This read-out process is repeated until the step counter ZZ reaches the count 15, and hence after fifteen numerals have been processed in the accumulator AK (corresponding to a word length of fifteen numerals or bits). At this stage the accumulator is occupied at its sixteenth column, the ring counter RZ5 is at count 1 and the ring counter RZ6 at count 4. Now column S16 receives reading and writing current through a corresponding driver core 12. Simultaneously, the transistor 31 is turned on through the OR-gate 30. For the duration of the clock pulse the transistor 31 passes a driver current of +⅔I into the marker line which sets the marker core M1. The next following clock pulse switches each of the ring counters RZ5 and RZ6 one step ahead and switches the step counter ZZ to 16. Now column S17 is occupied.

According to the invention the accumulator AK, at the beginning of the multiplication, is divided into two portions which both comprise fifteen decimal places. The division may be situated at any desired locality but must be such that the one factor (multiplicator), which at the beginning of the multiplication is located in any desired but known columnar range of the accumulator AK, will have its significant places fit into the fifteen digit places of the first word; and the second word length, which is to receive the result (product), must be set to zero at the beginning of the multiplication. In the embodiment described presently, the division is made between the second (S2) and the first accumulator column (S1). Accordingly, the first word length extends from column S2 toward the right up to column S16, and the second word length from column S17 to the left up to and including the column S1.

The first factor (multiplicator) must be entered into the left portion (S17–S1) of the accumulator prior to commencing the multiplication, and the right portion (S2–S16) of the accumulator AK is then set to zero. The second factor (multiplicand) reaches the computer from a memory FE, FD or any other suitable input means. In the illustrated example relating to an accounting machine the second factor is supplied from the input device 1 (FIG. 1). As mentioned, the second factor is entered into the right portion of the accumulator. When thus the column S17 is reached, the entering of the second factor reaches the least significant (lowest) decimal digit of the first factor (multiplicator) previously written into the accumulator. If the numeral previously written into column S17 is larger than zero, the second factor (multiplicand) is to be added into the other, now free portion of the accumulator AK as often as corresponds to the value of that column S17 numeral.

In the present example, the operation just described takes place as follows:

When the step counter ZZ reaches count 16, it triggers a bistable flip-flop 32, previously in the 0 state, to switch to the L state. The output 33 of flip-flop 32 now passes an opening signal to two AND-gates 34 and 35. If now the value read out of the column S17 in the above-described manner is larger than zero, the OR-gate 36 will respond and thus will operate, together with the AND-gates, as a discriminator. According to the selected 2-from-6 code, the value zero is defined by coincident presence of pulses on the two leads 29*a* and 29*d*, and conversely by the absence of pulses on the four other leads. Thus, a numeral differs from zero whenever a pulse occurs on any of these four other leads 29*b*, 29*c*, 29*e*, 29*f*; and this is recognized by the discriminator OR-gate 36. The output of AND-gate 35 thus furnishes a pulse when the step counter ZZ has reached the count 16 and if simultaneously a numeral different from zero is stored in the sixteenth accumulator column counted from the beginning of the computing operation, namely in column S17.

The output of the AND-gate 35 is connected by a lead 37 to the computer RW where it is connected through a lead 38 to the value lead W9 of the adder matrix DA. In this manner, a 9 is added to the numeral read out of column S17, which numeral constitutes the lowest decimal value of the first factor (multiplicator), and the transfer to the next decimal position is suppressed. This computing operation has the same effect as the subtraction of the value 1 from the numeral stored in column S17. As a result, therefore, the last (lowest) decimal of the first factor is reduced by the value 1.

A second lead 39 branches off the lead 37 and connects with the device from which the second factor (multiplicand) is taken, for example the memory FE or the input device 1 of the accounting machine, and causes this device in the next fifteen clock pulses to transfer the second factor, decimal by decimal, into the computer RW. However, a pause having the length of a single pulse must be inserted between the occurrence of the starting pulse on lead 39 and the first lowest decimal of the second factor. This pause is enforced by inserting a suitable time delay member (not illustrated). A further output lead 40 of the AND-gate 35 is connected to the AND-gate 41 as well as to the OR-gate 42. The output pulse of the OR-gate 42 passes through lead 52 to the two ring counters RZ5 and RZ6 and serves to clear the information contained in these counters, namely the 1 being shifted in these counters. The output 53 of the AND-gate 41, whose duration is limited by the clock pulse, serves to transfer the last counting state of the counters RZ5 and RZ6 into an intermediate memory ZS (FIG. 4) which forms part of the counter stage and is organized as follows.

Figure 4:
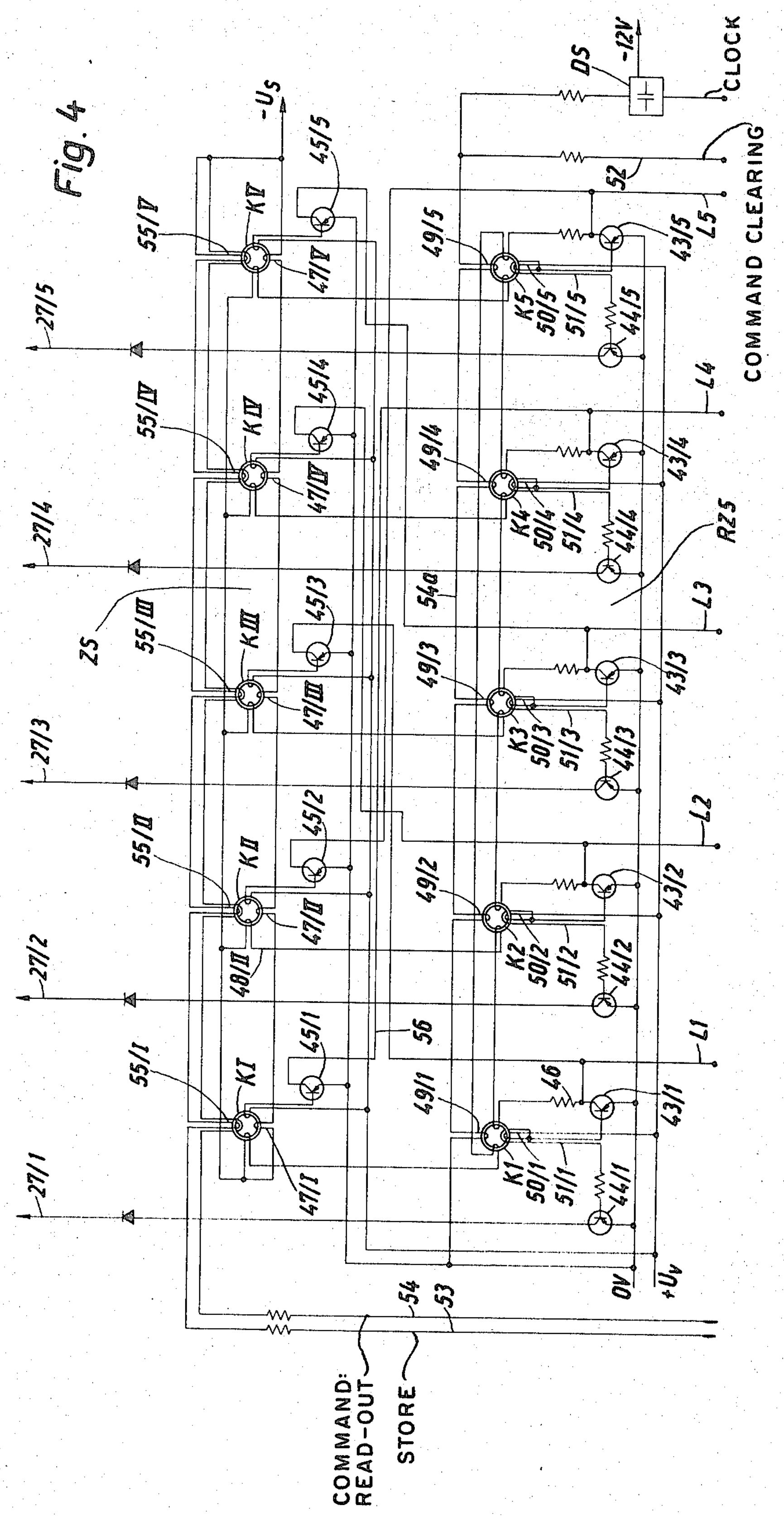
FIG. 4 is an electric circuit diagram of a ring counter with an intermediate memory, which forms part of the system shown in FIGS. 1 and 2.

The ring counter RZ5 for the accumulator AK comprises five ring cores K1 to K5 for the counting operation proper, these cores being connected with respective transistors 43/1 to 43/5 (FIG. 4). The ring counter is further equipped with five power transistors 44/1 to 44/5 which furnish the driver current for the driver cores, furthermore five memory cores KI to KV which, together with the transistors 45/1 to 45/5, constitute the above-mentioned intermediate memory ZS.

The individual functions of the ring counters RZ5 and RZ6 shall be explained by reference to the ring counter RZ5 only, since the same functions are analogously performed by the counter RZ6 which differs from counter RZ5 only by having one more counting step.

The ring counter RZ5 operates in a continuous counting sequence. A pulse arriving on one of the leads L1 to L5 (FIG. 4) establishes a given starting condition. This is done by placing one of these leads through the distributor circuit 25 (FIG. 2) to 0 volt.

In the embodiment represented in FIG. 4, this starting pulse (0 volt) is applied to the lead L1. The pulse passes through the collector resistor 46 of the transistor 43/1 and through the ring core K1 to the ring core K2 thus triggering the core K2 to the L-state. The ring core K1 is not affected because the direction of the current is such that it can cause a change only from the L-state to the 0-state, but the core K1 is already in the 0-state as are all of the ring cores prior to the beginning of the operation. The pulse on lead L1 simultaneously passes to a $-U_s$ voltage terminal through the core winding 48/II of the ring core KII in the intermediate memory ZS and also through an inhibit winding 47/I to 47/V inductively linked with all of the ring cores KI to KV.

The winding sense of the common inhibit winding 47/I to 47/V is opposed to that of the above-mentioned individual winding 48/II of core KII. Consequently, core KII will not be set since the counter excitation furnished by the inhibit winding 47/II compensates the effect of the individual winding 48/II. Relative to the other ring cores KI, KIII, KIV and KV, the current flowing in the winding 47/I to 47/V common to these cores has the zero direction and thus is without effect upon the setting of the cores.

At the next clock pulse a short pulse is given through a differentiating member DS through the common winding 49/1 to 49/5 of the cores K1 to K5 which are thus excited in known manner for a short interval of time during which the previously set core K2 commences to trip back to the 0 state. The same pulse produces through a second winding 50/2 a negative voltage at the base of the transistor 43/2 whereby the transistor is turned on and conducts current through the core K2, which aids the effect of the short excitation pulse from differentiating member DS until the core K2 is completely read out. The transistor 44/2 is controlled analogously through another winding 51/2 of the core K2 and furnishes a driver pulse through the lead 27/2. Furthermore, the core K3 is set to the L state through the collector current of the transistor 44/2 in the same manner as described above with reference to the setting operation. In this manner, the magnetization has passed from core K2 to core K3. The next clock pulse has the analogous effect of passing the magnetization from K3 to K4, thence to K5, K1, K2 and so forth.

According to the invention the last counter state is intermediately stored in the ring cores KI to KV of the intermediate memory. These cores are thereafter read out and the ring counter RZ5 is thereby reset to the corresponding starting condition upon occurrence of a jump. This jump is initiated by the pulses "clearing" at the output 52 of the OR-gate 42 and "storing" at the output 53 of the AND-gate 41. The "clearing" pulse which places $-U_s$ voltage upon the lead 52 in the ring counter RZ5 for the duration of the clock pulse, prolongs the short excitation pulse from the differential member DS and thereby prevents setting of the next following ring core in the counter RZ5. This is effected by a current which passes through the lead 54*a* inductively linked with all of the ring cores K1 to K5 and which acts in opposition to the setting current, for example in ring core K3, supplied from the transistor 43/2. The clearing pulse must have a longer duration than the setting pulse from transistor 43/2. The short excitation pulse coming from the differential member DS is not sufficient for clearing because it is considerably shorter than the setting pulse from transistor 43/2.

The "storing" pulse occurring on lead 53 simultaneously with the pulse "clearing" and passing through the windings 55/I to 55/V excites all of the ring cores KI to KV of the intermediate memory and eliminates the effect of the above-described common winding 47/I to 47/V. Consequently, the current issuing for example from transistor 43/2 and reaching the ring core KIII through the cores K2 and K3, can become effective and can set the core KIII. As a result, the last count of the ring counter RZ5 is memorized in the ring core KIII.

The current issuing from transistor 43/2 causes a positive flux in ring core KIII and a negative flux in the other ring cores KI, KII, KIV and KV through the windings 47/I to 47/V. The resultant flux in ring core KIII is equal to zero. An additional flow of current in the windings 55/I to 55/V ("storing") compensates the effect of the above-mentioned windings 47/I to 47/V. Thus, the resultant flux becomes equal to zero in cores KI, KII, KIV and KV but equal to +1 in core KIII. Hence, ring core KIII is set selectively.

In the AND-gate 41 (FIG. 2) the clock pulse limits the duration of the storing pulse and thus always secures for the "storing" pulse a shorter duration than that of the pulse from the respective transistors 43/1 to 43/5. This is necessary because otherwise a setting of the cores K1 to KV could take place exclusively through the windings 55/I to 55/V ("storing"). The "reading" pulse occurring at the next clock pulse and arriving through the lead 54, trips the previously set ring cores KI to KV in the intermediate memory ZS back to the zero state, while the corresponding one of the transistors 45/1 to 45/5 is controlled to turn on by a further winding of core KI to KV. This causes, through the leads 56, a setting of the one corresponding core K1 to K5 in the manner explained above, and this core is then read out during the next following clock pulse, thus repeating the operation.

Another output 57 of the AND-gate 35 sets the bistable flip-flop 58. With the next clock pulse the flip-flop issues a pulse through the lead 54 to the ring counters RZ5 and RZ6 in the manner already mentioned, whereby the last counter states memorized in the intermediate memory ZS are read out and the counters RZ5 and RZ6 are again set to a given new starting state. This start is spaced fifteen columns backwards in the accumulator AK and hence is situated at the first position of the free word range in the accumulator AK. Furthermore, the bistable flip-flop 32 is tripped to the zero state by the output pulse of the bistable flip-flop 58.

The new starting point in the example here being discussed is the column S2, corresponding to the counter states *RZ5*=2 and *RZ6*=2. It will be seen from the coordination table of FIG. 3 that for such a jump of fifteen positions in the reverse direction, for example from column S17 to S2 in the accumulator AK, the following applies: The counter RZ5 commences at the same state which it last occupied. The counter RZ6, however, commences at a point three positions displaced. The available possibilities are tabulated in the following:

| Last state of RZ6: | RZ6 after the jump |
|---|---|
| 1 | 4 |
| 2 | 5 |
| 3 | 6 |
| 4 | 1 |
| 5 | 2 |
| 6 | 3 |

It will be recognized from the table that there exists within the ring counters RZ5 and RZ6 a fixed coordination between the last and the first pulses of a jump. This coordination can be readily secured by corresponding interwiring.

The further operation proceeds as follows. The bistable flip-flop 58 issues through the OR-gate 28 a pulse which sets the step counter ZZ to the starting state. With the next clock pulse there begins the entering of the second factor (multiplicand) into the computer RW and, after the ensuing adding operation, the entering of the sum into the accumulator AK. Upon reaching the fifteenth decimal, the above-described process is repeated. That is, when a numeral larger than 0 is contained in column S17 of the accumulator AK, this numeral is reduced by 1, and another jump will take place with a subsequent addition and transfer into the accumulator AK, and so forth.

If the numeral in column S17 is equal to zero, the OR-gate 36 does not open. However, now the AND-gates 59 and 34 will open, whereas the AND-gate 60 remains closed because it receives an opening pulse from the second input only when for the presently read decimal a value other than zero is being read out of the marker cores M1 to M15. This is not the case with the example and at intsant here under consideration, since only the marker core M1 was set during the first pass. The 0 pulse, therefore, has no controlling effect upon the system. As a consequence, each of counters RZ5 and RZ6 simply moves to the next count. Hence, now a numeral is read out of column S18. Contained in column S18 is the second decimal of the first factor. If this decimal, too, is equal to 0, the ring counters simply continue running, and column S19 of the accumulator AK is next read out, and so forth. If the numeral in column S18 is not 0, a jump by fifteen places in the reverse direction occurs, namely from the column S18 back to column S3 of the accumulator AK.

Commencing from column S3, the second summand is now added into the accumulator AK and thus is multiplied with the factor $10^1$. By virtue of this new starting point of addition in the accumulator AK, the invention provides for the same effect as is caused by the shifting occurring in a shift register. However, whereas in a shift register the intermediate result is shifted by powers of ten relative to a fixed summand, the operation according to the invention is performed by shifting the starting point of the addition for the second summand relative to the fixed accumulator AK.

After all of the decimals appertaining to the first factor have been processed in the manner described, the computing operation reaches a portion of the accumulator in which the sixteenth count of the step counter ZZ coincides with column S1 of the accumulator AK. The marker core M1, which was set at the beginning of the first pass, is now read out because the wire of column S1 also passes through this marker core. As long as the numeral stored in column S1 is larger than 0, the marker core M1 is read out time and again and is each time newly set through the OR-gate 30 and the transistors 31 and 62. When ultimately the numeral in column S1 has become 0, the AND-gate is opened, whereby a clearing pulse passes through the OR-gate 42 to the ring counters RZ5 and RZ6 and clears these counters. This, however, does not set the intermediate memory ZS in counters RZ5 and RZ6. Furthermore, a pulse through the lead 63 reaches the central controller ZST by means of which the multiplying performance is brought to a close with the aid of the central control device ZS. The programmer PR, if desired, then transfers the result from the accumulator AK into the printing memory DS and thence into the code (value) converter 6 of the accounting machine.

The result of the multiplication in the accumulator AK may have a length of thirty places. The significant places of the product can be selected out of the total of thirty available places by a suitable starting address applied to the ring counters RZ5 and RZ6 when reading the result.

The numerical example $7951 \times 201 = 1,598,151$ may serve to shortly illustrate the above-described performance of a multiplication. Assume that the multiplicator 201 is already entered into the accumulator AK, commencing with the starting address in columns S17 to S19. The multiplicand 7,951 contained in the input device 1 is to be multiplied with this stored multiplicator. At the beginning of the multiplying performance the right portion of the accumulator AK, comprising the columns S2 to S16, is processed in the above-described manner without results. Thereafter the column S17 is read out and checked as to whether it contains a numeral larger than 0. In the example, the least significant decimal value of the multitiplicator, namely a 1, is contained in column S17. As described, this numeral is reduced by 1 and consequently becomes 0. The accumulator AK automatically jumps backwards by fifteen positions and thus reaches the column S2. Now the multiplicand, since only zeroes are contained in columns S2 to S16, is entered into the right portion of the accumulator, numeral by numeral, commencing with the lowest decimal position (column S2: numeral 1, column S3: numeral 5, column S4: numeral 9, column S5: numeral 7). Since during the further pass the column S17 in the accumulator contains 0, the accumulator continues running up to column S18 into which likewise a 0 is written, and thence automatically to column S19 in which a 2 is stored. Since this numeral 2 in column S19 is larger than 0, it is reduced by 1 and now again causes a jump by fifteen positions back to column S4. Beginning with this column, the multiplicand is again entered numeral by numeral from the input device 1 into the computer RW. The decimal read out of the particular accumulator column, commencing with column S4, is added in the computer RW to the numeral coming from the input device 1. The result is written into the same column S4. When thereafter the column S19 is read out, it contains a 1 which is again reduced by the value 1 so that now a 0 is contained in column S19. Now, there occurs another jump and an addition with transfer into the accumulator AK commencing with column S4. In the right portion of the accumulator, commencing with column S2, there is now contained the product of 7,951 times 201=1,598,151.

Only zeroes are now contained in the left portion of the accumulator. Consequently, no further jump and further addition with transfer in the accumulator AK are possible. The accumulator AK runs up to the column S1 and terminates the computation.

To those skilled in the art it will be obvious upon a study of this disclosure that our invention permits of various modifications with respect to components and circuitry and may be given embodiments other than particularly illustrated and described herein, without departing from the essential features of our invention and within the scope of the claims annexed hereto.

We claim:

1. The method of multiplying by repetitive addition in an electronic computer having an adder and having an accumulator comprising a column and line matrix of magnetic memory cores for storing intermediate results and the product, said method comprising the steps of varying the magnetic condition of selected ones of said memory cores of said accumulator to store the digital values of the multiplicator in the respective accumulator columns;

sequentially sensing the magnetic condition of the accumulator columns to sequentially transfer the columnar values of the multiplicator in ascending digital order, from right to left, from the accumulator to the adder;

simultaneously varying the magnetic condition of the adder to enter the multiplicand, digit by digit, into the adder and performing therein an adding operation for each sensed column of the accumulator;

varying the magnetic condition of selected ones of said memory cores of said accumulator to store the resulting sum back in the sensed column of the accumulator;

magnetically bypassing a selected number of columns of said accumulator in descending digital direction, from left to right, when adding an accumulator column with a stored digit value greater than zero before performing said adding operation; and repeating the magnetic condition varying, magnetic condition sensing and magnetic bypassing steps until the multiplicator is fully processed by the multiplicand and the product is stored in the accumulator.

2. The method of multiplying decimal numbers, according to claim 1, in an electronic computer having data input means and wherein said accumulator includes a left portion and a right portion, said method comprising the steps: of varying the magnetic condition of selected ones of said memory cores of said accumulator to store the multiplicator, decimal by decimal, in the left portion of the accumulator, sequentially sensing the magnetic condition of the accumulator columns to sequentially transfer the columnar values of the multiplicator in the ascending digital order, from right to left, from the accumulator to the adder;

varying the magnetic condition of the accumulator to enter the multiplicand, decimal by decimal, from the input means into the right portion of the accumulator in an ascending decimal order beginning with the lowest decimal with the lowest decimal a given number of columns to the right of the lowest decimal of the multiplicator; simultaneously varying the magnetic condition of the adder to add each multiplicand decimal to the adder and adding the value of said decimal to the then sense columnar value of the multiplicator as often as corresponds to the value of the lowest decimal of the multiplicator;

varying the magnetic condition of selected ones of the memory cores of said accumulator to store the resulting sum back in the sensed column of the accumulator and reducing the multiplicator column value next to be sensed by the value "1" upon each adding and restoring operation;

magnetically bypassing a selected number of columns of said accumulator in descending digital direction, from left to right, when adding an accumulator column with a stored digit value greater than zero before performing said adding operation;

magnetic condition varying and magnetic condition sensing operations for each next higher order column value of the accumulator and varying the magnetic condition of selected ones of the memory cores of said accumulator to store the resulting sum back in the then sensed column until the multiplicator decimal is processed down to zero; and varying the magnetic condition of selected ones of the memory cores of said accumulator to store the product in the right portion of the accumulator in the ascending decimal order commencing with the first sensed column of the right portion of the accumulator.

3. The method according to claim 2, wherein prior to beginning the multiplying operation the totality of accumulator columns are selectively divided at an intercolumnar point into said left portion and said right portion to divide said totality of columns into two numerically equal groups, the point of division being selected so as to have only the ultimately significant decimals of the product stored in the right portion of said accumulator.

4. Apparatus for multiplying by repetitive addition, comprising an electronic computer having an adder and having an accumulator comprising a column and line matrix of magnetic memory cores for storing intermediate results and the product; first input means operatively connected to said accumulator for writing the multiplicator in the accumulator to store the multiplicator decimal digit values in respective accumulator columns; sequential read-out means connected to said accumulator and said adder for sequentially reading the columnar values of the multiplicator in ascending digital order, from right to left, from the accumulator to the adder; second input means operatively connected to said computer for simultaneously entering the multiplicand, decimal by decimal digit, into the adder to add therein each digit to each simultaneously read-out columnar value of the accumulator; circuit means for writing the resulting sum from the adder back into the read-out column of the accumulator; discriminator means in controlling connection with said read-out means and responsive to reaching for addition an accumulator column with a written-in digit value larger than zero to then control said read-out means to bypass in descending digital direction, from left to right, a specific number of columns before performing the next column reading and adding operation.

5. Apparatus for multiplying by repetitive addition, comprising an electronic computer having an adder and having an accumulator comprising a column and line matrix of magnetic memory cores for storing intermediate results and the product and having a left portion and a right portion; first input means operatively connected to the left portion of said accumulator for writing decimal by decimal digit the multiplicator in the accumulator to store the multiplicator decimal digit values in the left portion accumulator columns; sequential read-out means connected to said accumulator and said adder for sequentially reading the columnar values of the multiplicator in ascending digital order, from right to left, from the accumulator to the adder; second input means operatively connected to the right portion of said computer for simultaneously entering the multiplicand, decimal by decimal digit into the right portion of said accumulator in an ascending decimal order beginning with the lowest decimal at a specific number of columns to the right of the lowest decimal of the multiplicator, means for simultaneously passing each multiplicand decimal to the adder and adding therein the value of said latter decimal to the then read-out columnar value of the multiplicator as often as corresponds to the value of the multiplicator lowest decimal; circuit means for writing the resulting sum from the adder back into the read-out column of the accumulator, said circuit means comprising means for reducing the multiplicator column value next to be read out by the value "1" at each adding and writing back operation whereby the product is stored in the right portion of said accumulator upon repeating the adding operation for each next higher-order column value of the accumulator and storing of the sum in the then read-out column as often as will process each multiplication decimal down to zero; discriminator means in controlling connection with said read-out means and responsive to reaching for addition an accumulator column with a written-in digit value larger than zero to then control said read-out means to bypass in descending digital direction, from left to right, a specific number of columns before performing the next column reading and adding operation.

6. Apparatus according to claim 5, further comprising selector means for dividing, prior to beginning the multiplying operation proper, the totality of accumulator columns at one of the respective inter-columnar points into said left portion and said right portion so as to selectively divide said columns into two numerically equal groups, whereby said point of division is selected to have only the ultimately significant decimals of the product stored in said right portion of the accumulator.

7. In apparatus according to claim 4, at least one of said first and second input means comprising a computer device, a manual posting device, a memory device and control means for selectively connecting said devices operatively to said accumulator.

8. Apparatus according to claim 5, further comprising a selector network having two clock pulse controlled ring counters, one of said counters having one more counting step than the other, said counters being connected to said accumulator for selective write-in and read-out of the accumulator columns in ascending decimal order; a step counter; a discriminator selectively responsive to a columnar values equal and unequal to zero respectively; logic circuit means connecting said step counter and said discriminator to said selector network for controlling said network to select a number of columns to be bypassed commencing with the least significant column, said number being determined by said step counter in accordance with the response of said discriminator to the multiplicator decimal being processed at a time; and an intermediate memory coordinated to said selector network for causing a number of columns determined by said step counter to be bypassed to the right.

9. In apparatus according to claim 8, said two ring counters having five and six steps respectively and having five and six outputs respectively; a matrix of ring cores connecting said outputs of said two counters with thirty columns of said accumulator so as to select one of said columns for write-in and read-out at a time dependent upon the particular two counter outputs then activated, said intermediate memory being connected to the outputs of said two counters for storing the respective last counts prior to a columnar bypass and for setting said counters after a bypass in accordance with the number of colunms determined by said step counter.

10. In apparatus according to claim 8, said step counter having a number of flip-flop stages equal to one-half the number of said accumulator columns and having a signal output at the penultimate stage; a switching transistor; a gate circuit connecting said signal output to said transistor for triggering the latter when said penultimate flip-flop stage of said step counter is tripped; a group of multiplication-controlling ring cores; a plurality of wires passing in pairs through said respective controlling cores each appertaining to one of the respective columns in said right and left portions of said accumulator; and circuit means connecting said switching transistor to said controlling cores for issuing a clearing pulse thereto when said switching transistor is triggered by said step counter.

11. In apparatus according to claim 10, said step counter having another output at its ultimate stage; a bistable flip-flop connected to said other output for response to tripping of said ultimate counter stage; two AND gates having respective inputs connected to said flip-flop and respective other inputs connected to and controlled by said discriminator; a clock pulse controlled AND gate having an input connected to the output of one of said two AND gates and having an output connected to said intermediate memory for supplying to said intermediate memory pulses to effect said columnar bypass; and gate circuit mean connecting the output of said other of said two AND gates to said ring counters for supplying a clearing pulse thereto.

References Cited

UNITED STATES PATENTS

| | | | |
|---|---|---|---|
| 2,923,472 | 2/1960 | Whitney | 235—160 |
| 3,001,710 | 9/1961 | Haynes | 235—160 |
| 3,021,066 | 2/1962 | Martens | 235—160 |
| 3,055,586 | 9/1962 | Davis | 235—160 |
| 3,118,056 | 1/1964 | Martens et al. | 235—160 |

FOREIGN PATENTS

| | | |
|---|---|---|
| 858,321 | 1/1961 | Great Britain. |

MALCOLM A. MORRISON, Primary Examiner

C. E. ATKINSON, Assistant Examiner

U.S. Cl. X.R.

235—156